Sept. 8, 1931.  A. D'HALLOY  1,822,805
AUTOMATIC LATHE
Filed June 19, 1928   5 Sheets-Sheet 2

Sept. 8, 1931.    A. D'HALLOY    1,822,805
AUTOMATIC LATHE
Filed June 19, 1928    5 Sheets-Sheet 3
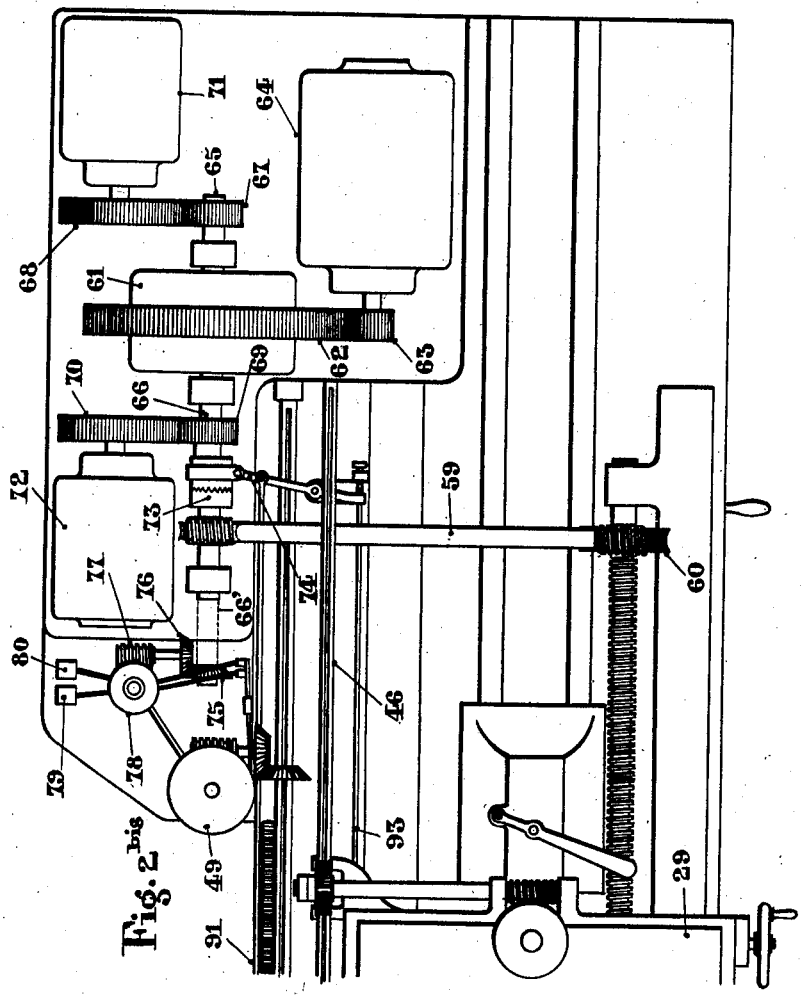

Sept. 8, 1931.  A. D'HALLOY  1,822,805
AUTOMATIC LATHE
Filed June 19, 1928  5 Sheets-Sheet 4

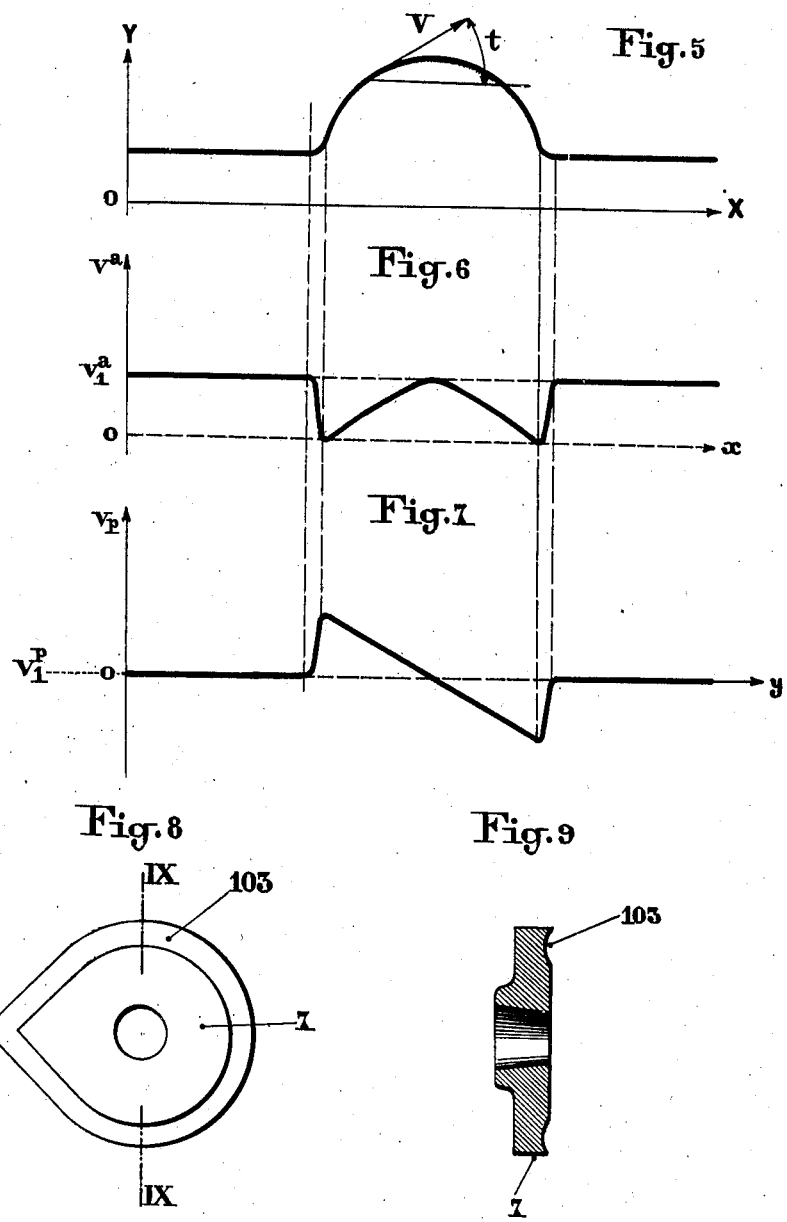

Patented Sept. 8, 1931

1,822,805

UNITED STATES PATENT OFFICE

AUDOIN D'HALLOY, OF PARIS, FRANCE

AUTOMATIC LATHE

Application filed June 19, 1928, Serial No. 286,647, and in France August 5, 1927.

It is known that, in order to manufacture on a lathe an article the profile of which follows a predetermined curve, it is necessary to impart to the tool being utilized movements of such a nature that the point or points of this tool which operate upon the mass to be worked follow, under suitable conditions, the above mentioned curved profile.

In order to obtain this result it has been necessary hitherto either to make a special tool or, if it is desired to utilize an ordinary tool, to provide an entire control device which is also of a special nature for each particular profile to be obtained. Such procedure presents numerous disadvantages and in certain cases the tools or the special control devices which it is necessary to obtain are extremely difficult to construct. In addition, in every case, the costs of manufacture are burdened with a relatively high initial expense, the redemption of which weighs heavily on the cost price at which the article can be sold whenever it is not a question of manufacture on a large scale.

The present invention has for its chief object to remedy the various disadvantages in question.

Accordingly the present invention comprises a lathe in which the movements which it is necessary to impart to the tool in order to obtain a given profile upon the article under treatment, are brought about automatically by means of continuous change-speed gear the action of which is regulated, i. e. actuated or controlled in a suitable manner, by means of diagrams corresponding to the profile of the piece to be obtained.

It will be readily understood, in fact, that if the axis of the lathe and one perpendicular to this axis are taken as the rectangular co-ordinate axes and assuming that in this system of co-ordinate axes the curved profile of the work-piece is shown by the following algebraic function: $f(x,y)$ the movements $x$ and $y$ to be imparted to the tool parallel to the axis of the lathe and perpendicular to this axis are themselves functions of a common variable, the time.

There is obtained: $x = u\ (t), y = v\ (t)$.

In consequence, by means of two diagrams, representing respectively, one the function $u\ (t)$, the other the function $v\ (t)$ and regulating in a convenient manner, either by actuating or by controlling it, the action of a double sliding tool-carriage, having two continuous change-speed gears, it will be possible to ensure that the point of an ordinary tool, or if a tool of the rotary forming type, such as a rotary forming cutter or the like is used the different points of this latter tool will follow exactly the profile of the article it is desired to obtain.

The continuous change-speed gears utilized may naturally be of absolutely any kind, either electric, mechanical, hydraulic or otherwise.

As regards the diagrams, they may, according to the nature of the continuous change-speed gears which are being used, consist either of simple curves outlined on drums or suitable surfaces, or of actual cam-grooves. According to one particular example, these diagrams may be traced on the same drum or on different drums interconnected by any suitable means.

In the accompanying drawings there is shown, by way of example, a particular embodiment of the invention; it will, however, be readily understood that the said embodiment may undergo modifications in its constructional details and may be supplemented by any other useful accessory device, without thereby exceeding the scope of the invention.

In particular, there may be attached thereto, for the purpose of effecting a continuous work in the rod, a cutting device and a centering device, both operating automatically after each work-piece has been machined, which device it has not been considered necessary to describe or illustrate, in view of the fact that they are already well known and form no integral part of the invention.

In the drawings:—

Figure 1a is a similar view of the other half.

Figure 2a is a similar view of the portion of the structure shown in Figure 2.

Figure 5 illustrates a particular profile it is desired to produce on an article.

Figures 6 and 7 illustrate the two diagram curves corresponding to the profile shown in Figure 5.

Figure 8 is a front elevation of a rotary forming tool of special shape permitting the machining of profiles containing acute angles.

Figure 9 shows a section of the said tool, on the line IX—IX of Figure 8.

Fig. 10 is a diagram showing the circuits controlling the continuous speed changing assembly.

Figure 1:
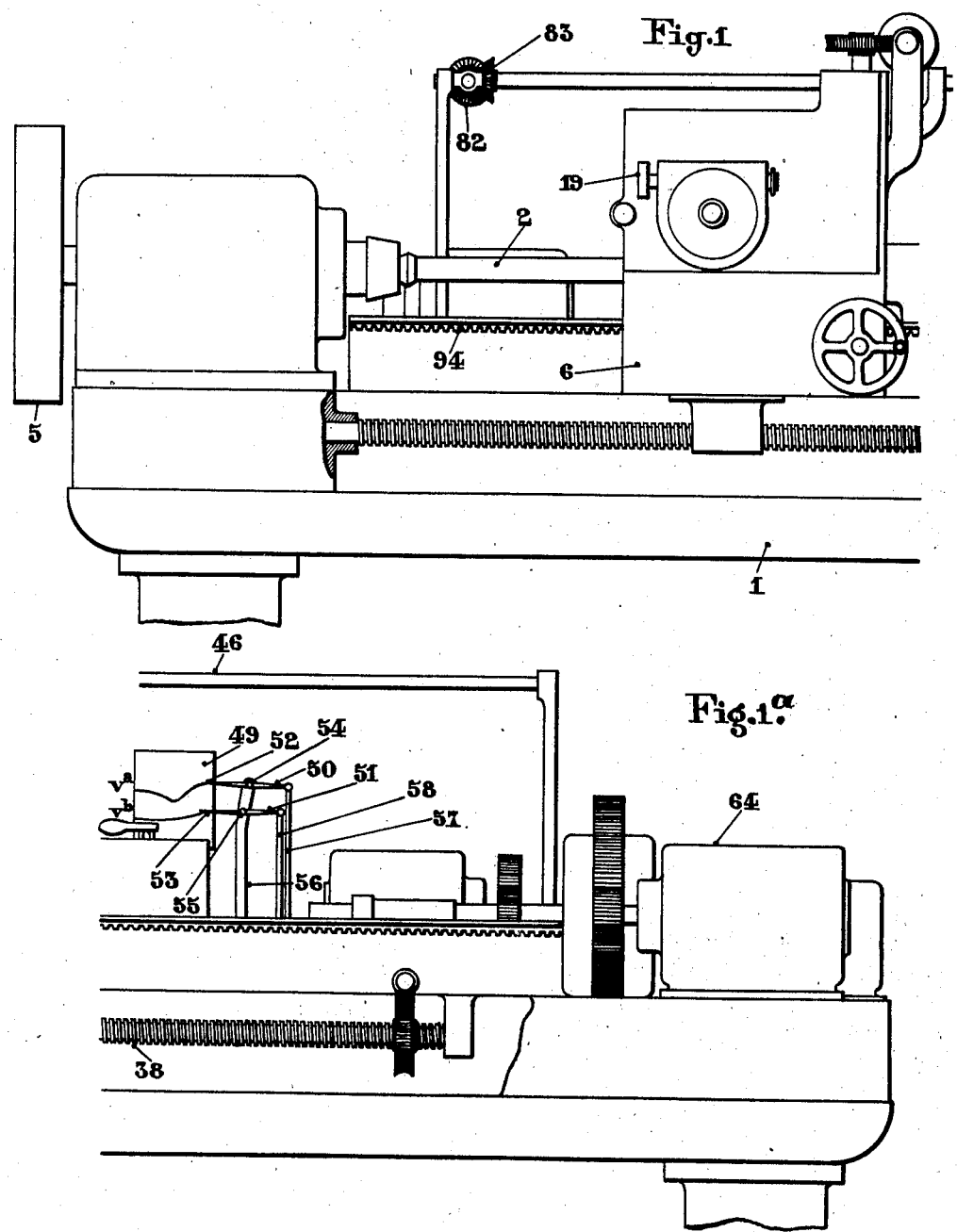
Figure 1 shows a longitudinal elevation of substantially one-half of the embodiment referred to above.

As shown in the drawings, the apparatus comprises a frame 1 on which are mounted, on the one hand the ordinary devices for fixing and actuating the rod 2 to be machined, the said rod being mounted between a tailstock 3 and a chuck 4 set in rotation in any suitable manner by means of a wheel 5; and on the other hand a tool carriage 6 with its different actuating and regulating devices.

The last mentioned elements with the combination of the whole obtained, constitute more particularly the object of the invention; it is therefore necessary to describe only these elements in detail.

In the particular embodiment described and shown by way of example a tool 7, of the rotary forming type, and circular in shape, is used.

This tool is mounted on a spindle 8 to which the following three distinct movements can be imparted:

1. A rotary movement around its axis.
2. A sliding movement parallel to the axis of the lathe, the speed of the said sliding movement being controlled and regulated, as will be indicated hereinafter, through a continuously variable change-speed gear by means of a diagram traced on a rotating drum.
3. A sliding movement perpendicular to the axis of the lathe, the speed of the said sliding movement being controlled and regulated, as will be indicated later, by a second continuously variable change-speed gear, by a second diagram traced on the abovementioned drum.

The tool 7 referred to above is mounted on a conical boss 9 provided on the spindle 8 and is maintained in position and rendered integral with the said spindle by the pressure exercised against it by a sleeve 10 surrounding the spindle 8 and which is in turn held in place by a means which will now be described.

Between the nut 11 and a shoulder 12 on the sleeve 10 there is mounted, with a slight amount of friction, around the said sleeve 10, an exteriorly threaded sleeve 13, surrounded in turn by a sleeve 14, internally tapped and forming a nut with respect to the preceding sleeve 14 which is held between two stops 15 and 16. This sleeve is integral with a helicoidal wheel 17 which meshes with an endless screw 18 to which rotation can be imparted by means of a handle 19.

When by means of the handle 19 the endless screw 18 is caused to turn, rotation is imparted to the tapped sleeve 14 and in consequence movement of the sleeve 13 parallel to the axis of the spindle 8 is brought about.

In consequence a movement of the spindle 8 and of the tool 7 is obtained.

At its other end, the spindle 8 is splined to a helicoidal wheel 20 which meshes with threads 21 cut in a spindle 22 of which the lower part 23, carries a helicoidal wheel 24 which meshes in turn with an endless screw device 25 carried by a grooved driving shaft 26.

The latter being set in motion in any suitable manner, under the action of the device which causes the rotation of the rod being machined, the transmission mechanism indicated above transmits the said movement to the shaft 8 and the tool 7.

There is thus obtained the rotation of the shaft 8 around its axis, that is to say the first of the three movements indicated above.

The spindle 8 is mounted in bearings 27 and 28 provided on a carriage 29 which is in the shape of a stirrup and which is mounted, with the aid of dovetailed guides 30 and 31 on a second carriage 32 which is in turn mounted, with the aid of three dovetailed guides 33, 34, and 35 on the frame 1 of the lathe.

A depending support 36, integral with the carriage 32 and having a tapped hole 37 forming a nut, through which passes a driving screw 38 set in motion, as will be indicated later on, with the aid of one of the continuously variable change-speed gears to which reference will be made hereinafter, serves to cause the automatic movement of the carriage 32 along the frame of the apparatus.

The movements of the secondary carriage 29 with respect to the primary carriage 32, are effected through the rotation of a spindle 39 mounted on the carriage 32 and which passes through an aperture 40 tapped in the horizonal upper arm of the carriage 29.

At the end of the spindle 39 is mounted a helicoidal wheel 41 which meshes with an endless screw element 42 mounted on a spindle 43 which, at its other end, carries a helicoidal worm wheel 44.

The latter meshes with an endless screw element 45 mounted on a grooved spindle 46 acutated by means of one of the two continuously variable change-speed gears to which reference will be made later.

Apertures 47 and 48 provided in the vertical lateral walls of the carriage 32 enable the spindle 8 to move freely in a vertical direction simultaneously with the carriage 29.

According to the preceding description, it will be seen that on the one hand the rotation of the screw 38 causes the sliding movement, parallel to the axis of the lathe, of the carriage 32, of the carriage 29 and in consequence of the tool 7, and on the other hand that the rotation of the spindle 46 causes a sliding movement in a vertical direction (i. e. perpendicularly to the axis of the lathe) of the carriage 29, the spindle 8 and in consequence of the tool 7.

Owing to the combination of these two sliding movements, it is possible to cause the tool 7 to follow any path in a vertical plane passing through the axis of the lathe or parallel to this axis and, at the same time, it is possible to cause the tool to turn around its centre, so that its different points attack successively the different parts of the rod to be machined.

In order to obtain satisfactory work, it is essential that the tool should move at a constant speed along the profile of the piece to be obtained.

If the vector V Figure 5 tangent to the curved profile, represents the constant speed in question, the movements of the tool, respectively parallel to the axis of the lathe and perpendicularly to this axis, should be equal or proportional respectively to $V \cos t$ and to $V \sin t$, $t$ indicating the angle which the vector V forms with the direction of the axis of the lathe taken as the abscissæ axis.

For example, to the curved profile shown in Figure 5 there will correspond (1) the diagram of the speeds of the tool, parallel to the axis of the lathe, $v^a$, which diagram is shown in Figure 6, and (2) the diagram of the speeds of the tool, perpendicular to the axis of the lathe, $v^p$, which diagram is shown in Figure 7.

In order to impart to the tool 7 the speeds $v^a$ and $v^p$, two devices are used such for example as described in my copending U. S. application filed June 19, 1928, Serial No. 286,646 for "change-speed gear".

There is traced, or preferably, engraved, on a drum 49 or on any other suitable surface displaced with a movement corresponding to the speed of rotation of the rod being machined, diagram curves $v^a$ and $v^p$.

Two levers 50 and 51, of which the points 52 and 53 follow the curves $v^a$ and $v^p$ engraved on the surface of the drum 49 and which are adapted to pivot round axes (spindles) integral with a fixed support 56, control by means of two connecting rods 57 and 58 the two continuously variable change-speed gears respectively arranged at each of the two extremities of the machine.

Figure 2:
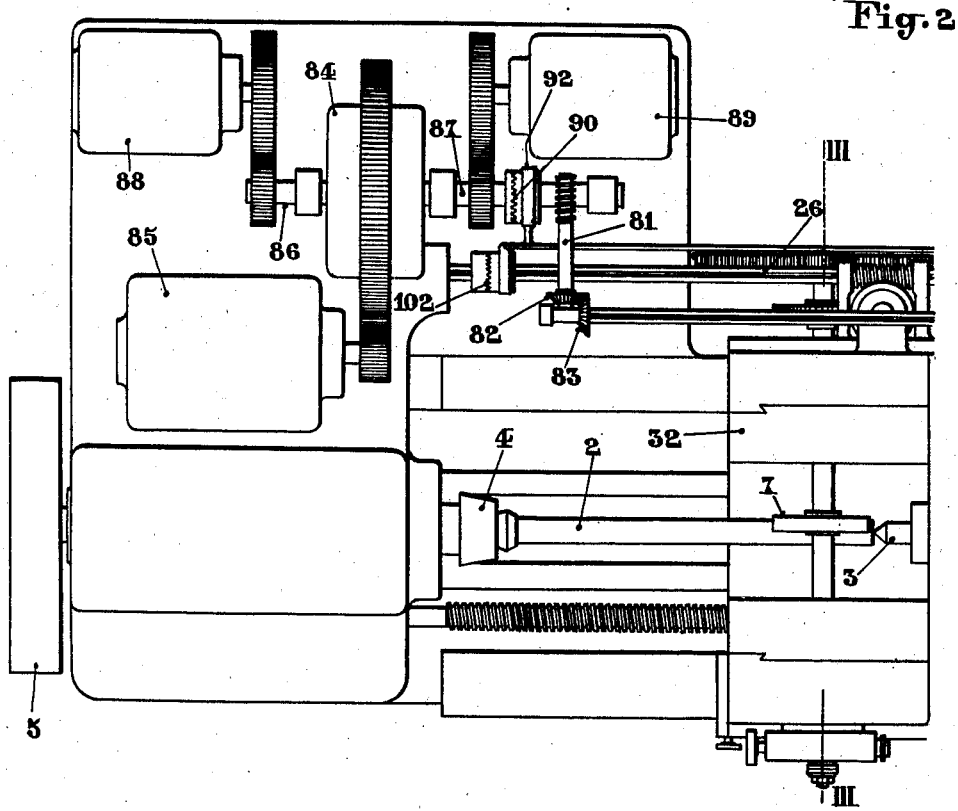
Figure 2 is a plan view of the portion of the structure shown in Figure 1.

The continuously variable change-speed gear shown at the right hand parts of Figures 1 and 2 controls, by means of a shaft 59 with endless screws and a helicoidal pinion 60, the rotation of the screw 38.

As described in the hereinbefore mentioned prior French patent, the continuously variable change-speed gear in question comprises a differential 61 the spur gear 62 of which meshes with a pinion 63 keyed on to the shaft of a dynamo or motor 64. The two shafts 65 and 66 of the planetaries of the differential in question are connected, by means of gear wheels 67, 68, 69, 70 respectively to two suitable motors 71 and 72.

A disengaging device 73, controlled by a connecting rod 74, enables the connection between the shaft 66 and the shaft 59 to be broken.

The shaft 66' which, when the clutch 73 is in engagement, constitutes the prolongation of the shaft 66, is connected by means of two bevelled pinions 75, 76 and an endless screw 77, to a regulating device 78 adapted to compensate and correct any accidental variations injurious to the speed, which might arise.

The said regulator 78 is interposed between the driving rods 57 and 58 referred to above and the relays 79 and 80 interposed in the electric circuit of the two continuously variable change-speed gears.

The continuously variable change-speed gear shown to the left of Figures 1 and 2, acts by means of a shaft 81 and the pinions 82, 83, on the grooved shaft 46 by means of which are effected the vertical displacements of the carirage 29.

As in the preceding one, this change-speed gear comprises a differential 84 with the large crown wheel of which engages a pinion keyed on the shaft 85 of any suitable motor, the shafts 86, 87 of the planetaries of the differential in question being connected, by suitable gears, to the shafts of the two motors 88, 89.

A de-clutching device 90, mounted on the shaft 87, enables the connection between the shaft 81 and the continuously variable change-speed gear actuating the rotation of this shaft, to be broken.

The actuation of the de-clutching device 90, is obtained simultaneously with that of the de-clutching device 73, a connecting rod 91 connecting the movable plate 92 of the clutch 90 to the lever 74. The speeds of motors 71 and 72 are regulated by means of a sliding contact 14$^a$ mounted on the end of a lever 15$^a$ pivoted on speed control 78 at 19ª. Lever 15ª is displaced angularly by lever 50 connected at opposite extremities to levers 54 and 15ª and moves contact 14ª along a resistance 13ª so as to increase the resistance in the circuit feeding motor 71 in the proportion to which it decreases the resistance of the circuit feeding motor 72 and vice versa.

This arrangement yields a continuous range of speeds for shaft 38 under the control of cam 49 capable of being varied in accordance with any predetermined "law" or function desired.

The latter may be actuated either by hand or automatically when the machining of the piece is finished, a thrust rod 93, integral with the carriage 32 being provided for this purpose.

When the machining of a piece has been finished and same is removed, it is necessary in order to undertake the machining of a new piece to bring the two carriages and the tool used back to their initial positions.

In addition, it is necessary that this return to the initial position should be effected as rapidly as possible, in order to avoid the loss of time.

For this purpose there has been provided, on the side of the frame 1 of the lathe, a rack 94 with which meshes a pinion 95 which is mounted on the carriage 32 and which is caused to rotate by a hand wheel 96.

In order to render possible the displacement which it is desired to obtain, it is of course necessary to liberate the crank arm 36 of the screw 38. This liberation is effected owing to the fact that the part of the arm 36 which acts as nut and in which is the tapped aperture 37 referred to above, is formed of two elements 97 and 98, jointed at 99, and which it is possible to open or shut at will.

Figure 3:
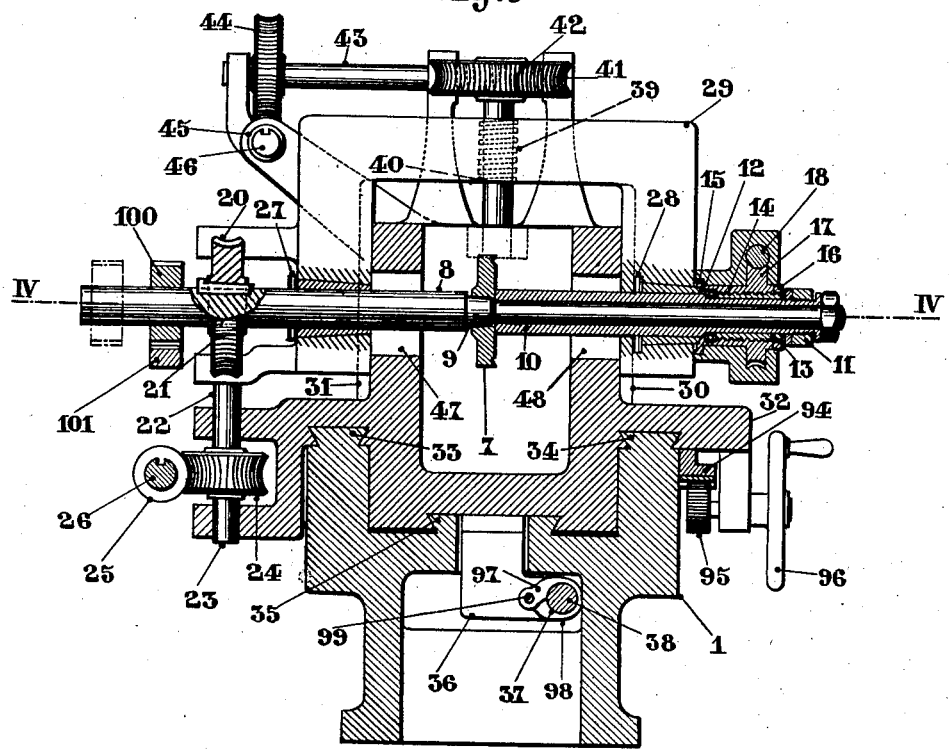
Figure 3 shows a detailed section on the line III—III of Figure 2.
Figure 4:
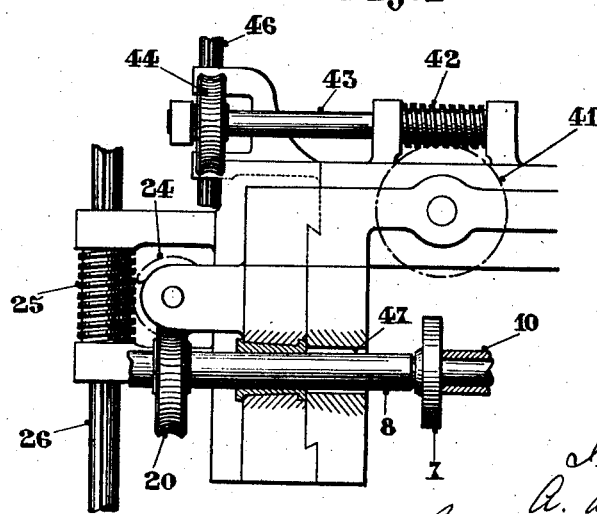
Figure 4 shows a detailed section on the line IV—IV of Figure 3.

In order to bring the tool itself back to its initial position, there has been provided, at one of the ends of the spindle 8, a pinion 100 adapted to slide along the said spindle and which when brought into the position shown in full lines in Figure 3 meshes with a fixed rack 101 integral with the frame of the apparatus.

During working, the said pinion is brought into the position shown in dotted lines in Figure 3, so as not to interfere with the movement which is imparted to the tool through the spindle 26.

On the contrary, during the return of the carriage and the tool to their initial points of departure, it is the spindle 26 which is released by means of a declutching device 102 provided between this spindle and the main drive of the lathe.

The said spindle, being then able to turn freely, no longer offers resistance to the rotary movement imparted to the tool by the action of the rack 101 on the pinion 100.

The apparatus which has just been described enables, by means of standard rotary forming tools, pieces having profiles of the most divergent kind to be produced. In the case of circular rotary forming tools, the only condition imposed on the tool is that its radius should be less than, or at the most, equal to that of the radii of curvature of the curved profile of the piece which it is desired to obtain.

When the curved profile of the piece which it is desired to obtain has acute angles, i. e. points where the radius of curvature is nil, it is necessary, instead of using the circular forming tool referred to above, to use a milling tool of special shape, for example a forming tool 103 in conformity with that which is shown in Figures 8 and 9.

This forming tool comprises an angular part 104 which renders it possible to machine acute angles.

Naturally, the size of the angle 104 may be chosen at will. In the embodiment shown an angle equal to a right angle has been adopted, but this may be smaller or greater as desired.

With a certain number of standard forming tools, it is possible to effect every possible curved profile.

In addition it is also possibe to utilize, for each of the profiles to be machined, forming tools constructed specially for the profile in question.

This latter method has the disadvantage of rendering it necessary to manufacture a special tool for each type of article to be produced; on the other hand it has the advantage of simplifying the preparation of the diagrams although even in the case of standard tools, the preparation of the said diagrams is relatively easy and may be effected graphically.

In the case of forming tools of any section, the diagrams are obtained according to the same law as that indicated above, but on the basis, not of the curved profile of the piece to be machined, but on the curve described by the axis of the forming tool, when the curve-section of the said forming tool is moved along the curved profile of the piece to be machined.

In the case where an ordinary non-rotary tool is used, the determination of the diagrams will be effected exactly in the same manner as in the case of circular forming tools.

Finally, when by reason of considerable differences between the diameters of the various sections of an article it is essential, in order to preserve a suitable cutting speed, to vary the speed of rotation of the rod to be machined, it is possible, naturally without exceeding the scope of the invention, to combine with the two change-speed gears indicated above a third change-speed gear acting on the drive of said rod.

Any suitable connection set up between this third device and the first two will enable the desired corelation between the variations in the movement of rotation of the rod and the displacements imparted to the tool to be obtained.

Such as described, the apparatus forming the object of the invention constitutes an essentially new product, capable of rendering appreciable services.

What I claim is:—

In a lathe, a tool support, rotatable means for displacing said tool support, a first motor connected in driving relation to said rotatable means, a second motor, a differential interposed between said first and second motors, a third motor driving said differential, a cam, and means operative by said cam to vary the speed of said first motor.

In testimony whereof I have signed my name to this specification.

AUDOIN d'HALLOY.